United States Patent

[11] 3,550,791

| [72] | Inventors | Richard D Smith<br>Palo Alto;<br>Dale A. Furlong, Sunnyvale; Ronald D.<br>Kinsey, Cupertino, Calif. |
|---|---|---|
| [21] | Appl. No. | 756,596 |
| [22] | Filed | Aug. 30, 1968 |
| [45] | Patented | Dec. 29, 1970 |
| [73] | Assignee | Combustion Power Company, Inc.<br>Palo Alto, Calif.<br>a corporation of the District of Columbia.<br>By mesne assignments |

[54] MATERIALS STORAGE AND CONVEYING ASSEMBLY
6 Claims, 11 Drawing Figs.

[52] U.S. Cl..................................................... 214/17,
222/389, 222/405
[51] Int. Cl..................................................... B65g 65/38

[50] Field of Search........................................... 214/17.8,
17.82; 222/168, 389, 405

[56] References Cited
UNITED STATES PATENTS

| 2,896,824 | 7/1959 | Sheldon...................... | 222/168 |
| 3,001,652 | 9/1961 | Schroeder et al............. | 214/17(.8) |
| 3,091,351 | 5/1963 | Wellford et al.............. | 214/17(.82) |

Primary Examiner—Robert G. Sheridan
Attorney—Limbach, Limbach & Sutton

ABSTRACT: A materials storage and conveying assembly is described in the form of a turntable supportable and rotatable in a chamber, a system for controlling the elevation of the turntable in the chamber and a system for turning the turntable in the chamber for receiving and delivering material respectively to and from the turntable.

INVENTORS
RICHARD D. SMITH
DALE A. FURLONG
RONALD D. KINSEY
BY Limbach and Limbach
ATTORNEYS

PATENTED DEC 29 1970

INVENTORS
RICHARD D. SMITH
DALE A. FURLONG
RONALD D. KINSEY

BY Limbach and Limbach
ATTORNEYS

MATERIALS STORAGE AND CONVEYING ASSEMBLY

The invention described herein was made in the course of or under a contract with the Department of Health, Education and Welfare.

The present invention is directed in general to a materials storage and conveying assembly and more particularly to a carousel-type assembly rotatable and elevatable for storing and distributing material.

Broadly stated, the present invention relates in general to a materials storage and conveying assembly of the type adapted to receive bulk material and store varying amounts of such material for prescribed and possibly indeterminate periods of time. The assembly includes a chamber, typically cylindrical, a turntable, also typically cylindrical, supportable and rotatable in the chamber, a system for supporting and elevating the turntable in the chamber and a system for turning the turntable in the chamber for receiving and delivering material to and from the turntable.

While the present invention is applicable for use in a variety of situations, one use for a large assembly constructed in accordance with this invention is for receiving, storing and conveying bulk waste in a solid waste (refuse) disposal plant. In a plant of this nature, a material storage and conveying assembly is required for receiving a large volume of refuse such as from collection trucks all arriving at generally one peak period of the day and for storing this material for conveyance into the waste disposal plant during the remainder of the time period before the next peak reception time.

With the present invention, a circular reception turntable is provided to which collection trucks may be directed from substantially the entire circumference to handle a maximum number of trucks at peak traffic since customarily, refuse trucks generally operate in one time period, primarily during early morning hours.

Additionally, since the elevation of the turntable in the assembly in accordance with the present invention can be changed, varying volumes of waste can be stored on the turntable depending upon the difference between the rate of removal therefrom, and the rate of deposition thereupon.

In accordance with another aspect of the present invention, the housing enclosing the top of the chamber in which the turntable is supported is provided with movable curtains permitting access to the turntable. In accordance with this aspect of the present invention, the material on the turntable can be hidden from view by the movable curtains and the movable curtains can serve as an air screen to isolate the air over the turntable from the surrounding environment so that a waste disposal plant can be located in urban areas.

In accordance with still another embodiment of the present invention, the turntable is supported by floating within the chamber and the elevation of the turntable controlled by manipulation of the flotation material. The flotation materials can either be water or air and the volume of the flotation material changed within the chamber beneath the turntable to position the turntable at the elevation desired.

In accordance with still another embodiment of the present invention, a stationary leveling blade is provided in a position above and extending over the turntable for leveling material positioned on the turntable during rotation thereof. In accordance with this aspect of the present invention refuse can be conveyed centrally of the turntable from dumping regions radially outwardly thereof by the stationary blade as the turntable rotates and refuse material can be directed off the turntable into an exit chute by the blade so that an extremely large diameter turntable can be utilized efficiently.

In accordance with still another embodiment of the present invention, the upper circular surface of the turntable declines in height from the center radially outwardly thereof and the material conveyed from the turntable at a radial outward location. This construction facilitates final clearance of material off of the turntable.

Other objects and advantages of the invention will become apparent when reading the following description and referring to the accompanying drawing in which similar characters of reference represent corresponding parts in each of the several views.

Figure 1:
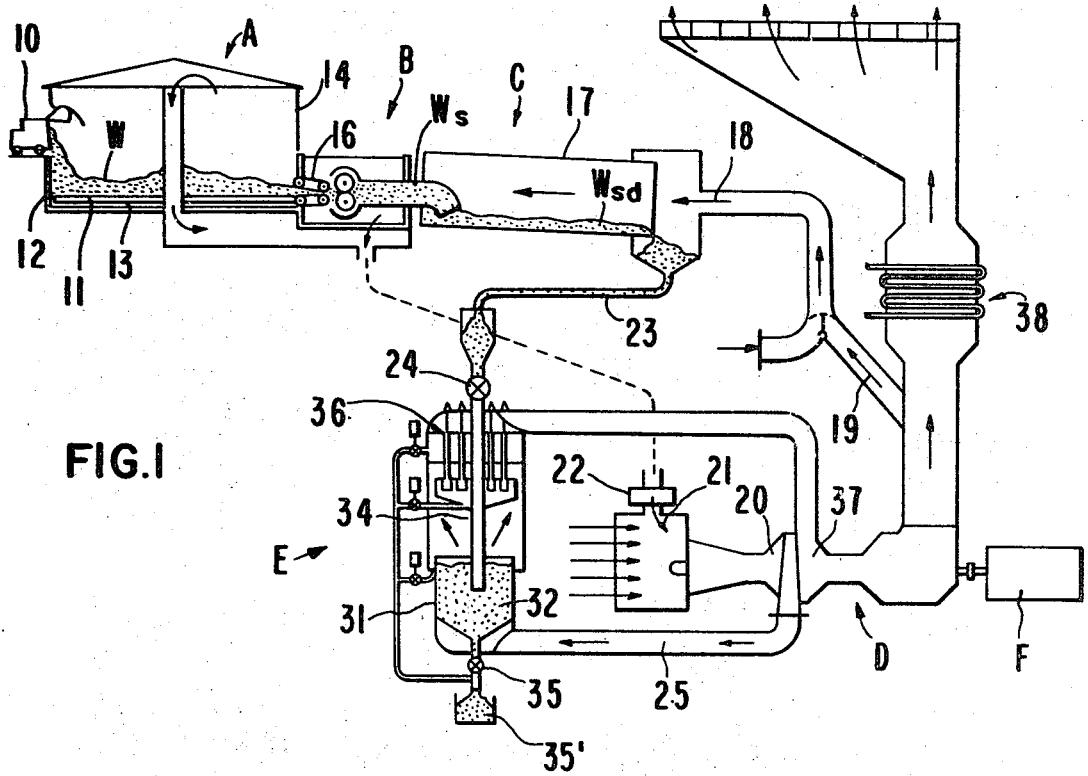
FIG. 1 is a schematic flow diagram of a waste disposal system and illustrates the operation of several different aspects of the present invention.

FIGS. 6—11 are schematic elevational sectional views showing the operation of different embodiments of the present invention for controlling the elevation of the rotating platform.

While the present invention is utilizable for the storage and distribution of a variety of materials in a variety of processes, it is particularly adaptable for use in a solid waste disposal system. Therefore, by way of illustrative example, the material storage and conveying assembly in accordance with the present invention will be described with reference to use in such a solid waste disposal system.

With particular reference to FIGS. 1—4, there is shown in schematic form a solid waste disposal system and different utilizations thereof. As schematically illustrated, the solid waste disposal system utilizes a waste receiving and storage assembly A in accordance with the present invention, a shredding assembly B, a drying assembly C, a gas turbine assembly D, a disintegration assembly E, and an electric generator assembly F.

The solid wastes are typically received from municipal collection trucks 10 which dump the waste into the receiving and storage assembly A which includes a circular turntable or carousel 11 floating on a pond of water 13 within a hollow cylindrical housing 12 with suspended glass cloth panels 14 permitting truck access to the carousel and with the carousel rotatable to feed the solid wastes W into the shredding assembly B. The carousel 11 can be raised and lowered to assist refuse dumping and feeding operations by adjusting the level of pond 13 thereby eliminating the need for a crane and associated high-bay construction in the solid waste storage area. A large effective tipping area for the collection trucks 10 is provided by the circular shape of the carousel 11 and the panels 14 screen off the storage area while permitting an inflow of fresh air.

The solid wastes W are directed by a fixed leveling blade 15 over the carousel 11 into conveyors or a chute 16. The turntable elevation and the rotational speed can be controlled automatically or remotely controlled by an operator in the central control room of the waste disposal plant where the operator observes the carousel operation by closed circuit television.

In the shredding assembly B, all of the solid wastes W are shredded to form a more nearly homogeneous shredded material $W_s$ which is easily transported through the remainder of the system by conventional automated devices for materials handling. The solid wastes $W_s$ are dried in the drying assembly C to increase the burning rate of waste in the overall system and eliminate the variability in burning rate resulting from widely different moisture contents.

The heat utilized in the drying assembly C is provided by a heated airstream 18 which obtains its heat from a portion of the exhaust gases 19 from the turbine assembly D.

The gas turbine assembly draws at least a portion of its compressor intake air 21 through a filter 22 from the air space above the waste in the receiving and storing, shredding and drying assemblies, A, B, and C, respectively, to prevent dust and odors from escaping to the environment. The shredded and dried solid waste $W_{sd}$ is transported via a conduit 23 and fed into the high-pressure environment of the disintegration assembly E such as by a rotary feeder 24.

In the compression portion 20 thereof the gas turbine assembly D compresses the intake air 21 from the other assemblies and from the outside environment to elevated pressures and temperatures such as 100 p.s.i.a. and 584° F. or 200 p.s.i.a. and 700° F. This hot high-pressure air is ducted via conduit 25 to the disintegration assembly E to provide the oxygen combustion of the solid wastes.

The disintegration assembly illustrated in FIG. 1 includes a combustion chamber 31 in the form of a fluid bed reactor. Sand or other inert particles 32 are contained within the chamber 31 above a porous grate 33 and suspended or fluidized during operation by passing air therethrough. Limestone or dolomite can be added to the particle bed for control of noxious gases. The shredded dried waste $W_{sd}$ is injected directly into the bed of particles 32 by a conduit 34 from the rotary feeder 24. This bed of particles 32 is initially heated by an external source (not shown) to an elevated temperature for combustion of waste material and combustion is maintained with the compressed hot gases from the gas turbine assembly D passing into combustion chamber 31 from conduit 25 and through the grate 33.

Most of the ash remaining after combustion is complete will be carried off with the gases leaving the fluid bed surface and subsequently collected by particle collectors 36. The ash particles which are larger or more dense than the inert particles 32 forming the bed eventually reach the bottom of the fluid bed reactor in the combustion chamber where they are removed by the rotary airlock 35.

The hot gases leaving the particle collectors 36 are expanded through the expansion and drive portion 37 of the gas turbine assembly D which drives the compressor portion 20 of the assembly D, and rotation of the gas turbine drives the electric generator assembly F to produce electric power.

The hot gas leaving the turbine assembly D is near atmospheric pressure but at elevated temperature so that the portion 19 can be utilized for drying shredded solid waste material in the drying assembly C as described above. If solid waste has a moisture content of 20 percent and this moisture is boiled out in the dryer, less than 10 percent of the exhaust gases need be recirculated. An optional exhaust heat recovery boiler 38 can be provided in the exhaust line from the gas turbine for utilization such as steam for heating, air-conditioning, etc. The hot exhaust gas is decelerated in an enlarged exhaust plenum and released to the atmosphere from a large area in the roof of the plant.

Figure 2:
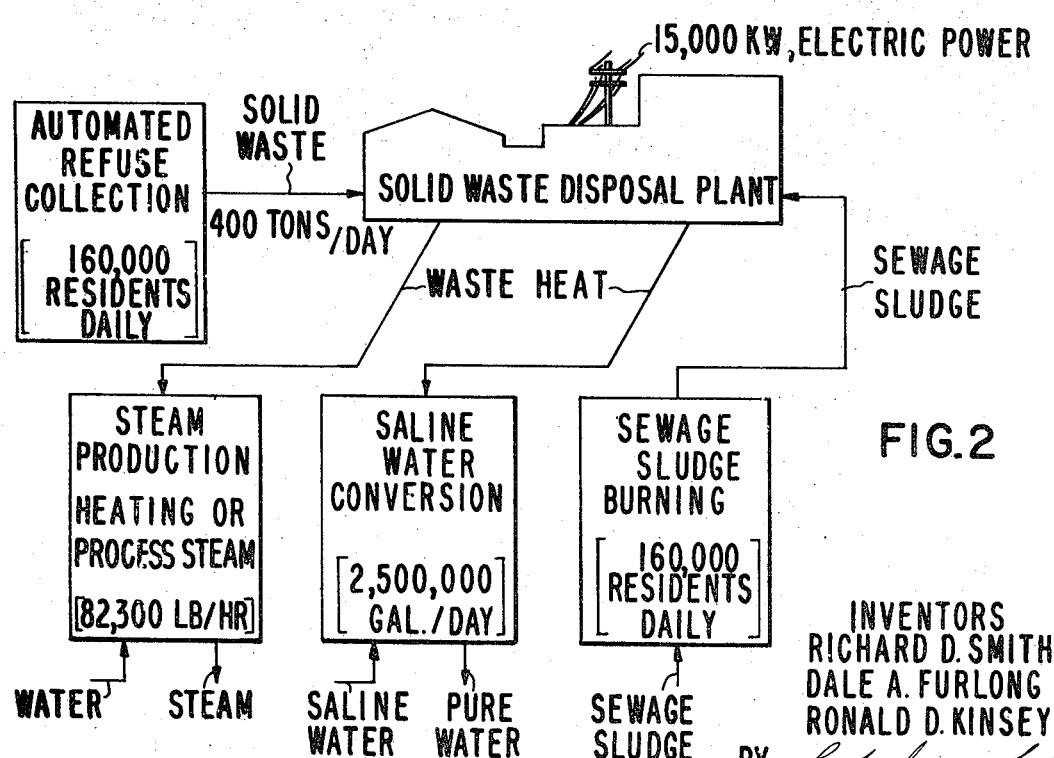
FIG. 2 is a schematic diagram illustrating different system utilizations for the present invention.
Figure 3:
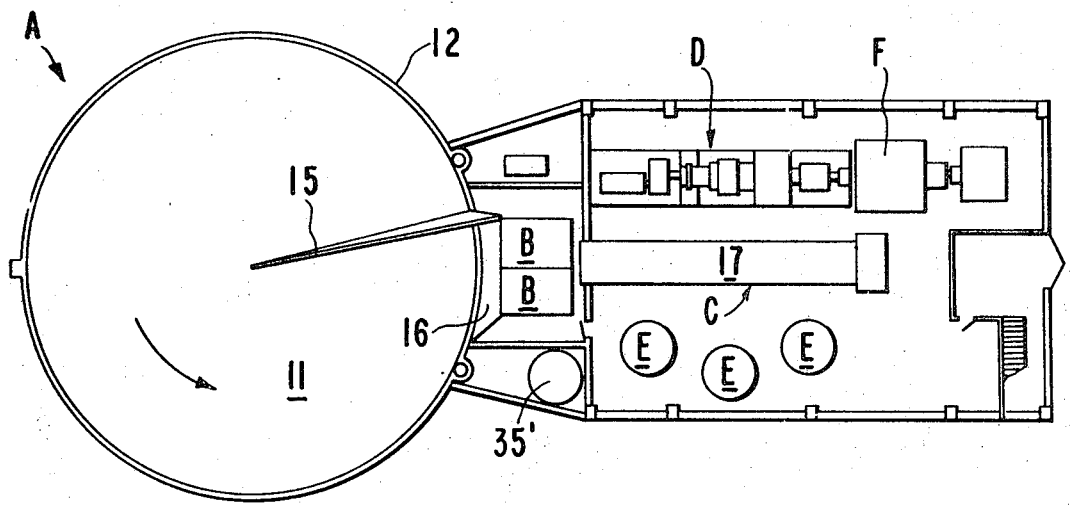
FIG. 3 is a plan view of an operative embodiment of the present invention.

As illustrated in FIG. 2, use of the gas turbine cycle for waste collection allows performance of many services to the community besides incineration of solid wastes. For example, the capability of the gas turbine compressor can be utilized to draw a powerful vacuum and suck the solid waste through underground pipes and deposit this waste in the carousel for disintegration in the disposal system. Alternatively, the exhaust heat from the gas turbine can be utilized to produce fresh water daily from saline or brackish water. Still further, the disposal system can be utilized to incinerate the sewage sludge resultant from sewage systems.

Figure 4:
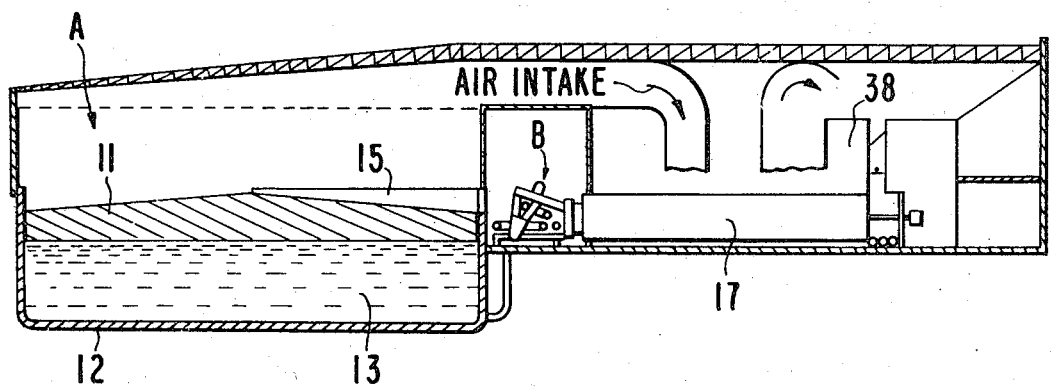
FIG. 4 is an elevational view, partially in section, of the embodiment illustrated in FIG. 3.
Figure 5:
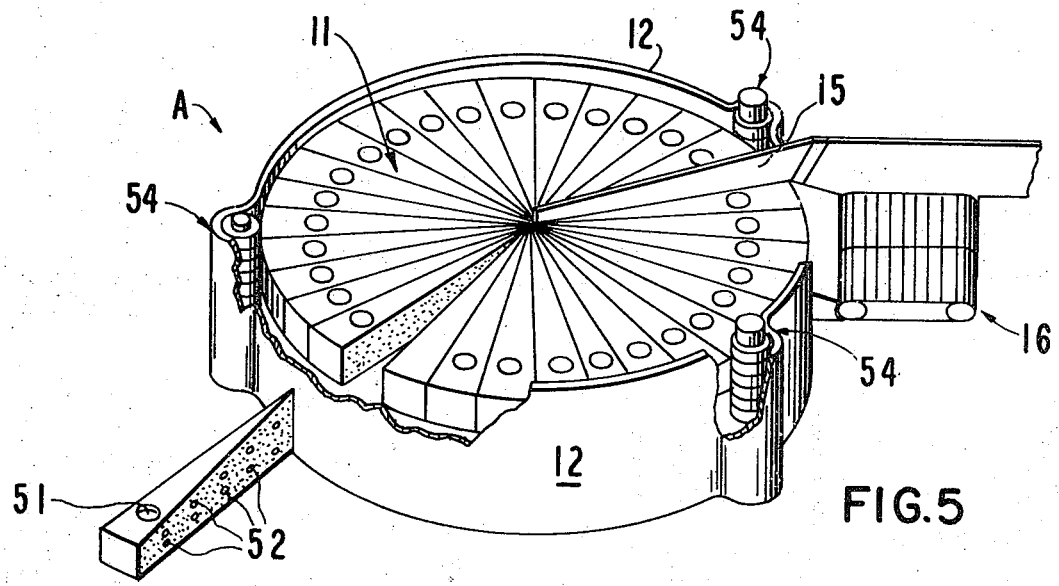
FIG. 5 is a perspective view partially broken away and partially exploded.

As illustrated in greater detail in FIGS. 4 and 5, the carousel or turntable 11 is floatable and can be a segmented or compartmentized barge floating such that it can be raised and lowered by changing the level of the floating material in the housing 12. The turntable 11 thus can be composed of wedge shaped hollow compartments 50 each with an sealable access hatch 51 and attach points 52 for connection to adjacent wedges. Each segment can be fabricated of resin-impregnated fiberglass to be abrasion resistant, watertight, lightweight and economical.

The upper circular surface 53 of the turntable 11 declines in height from the center radially outwardly thereof to facilitate the transfer of the last remnants of solid wastes into the shredder assembly B to completely empty the turntable. Where there is any unevenness to the waste material piled on the turntable 11, the leveling blade 15 will cause the material to level out. The blade 15 is sloped to the same contour as surface 53 to augment the turntable cleanout as well as to assist transfer of solid wastes to the shredders even when the carousel is full.

The turntable rotational force is provided by an electric drive motor (not shown) which actuates the rubber wheeled drive shafts 54 extending substantially the full depth of the housing 12 and contacting the periphery of the turntable 11. There is adequate contact between shafts and the edge thickness of the turntable to permit an efficient friction drive.

Sufficient free board is provided for the turntable to assure that a stable platform exists; that is, the bobbing or dipping effect of the instantaneous eccentric application of two or three loads of solid wastes, even on an empty turntable, is not excessive.

Figure 6:
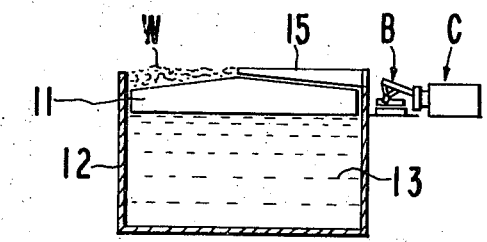
Figure 7:
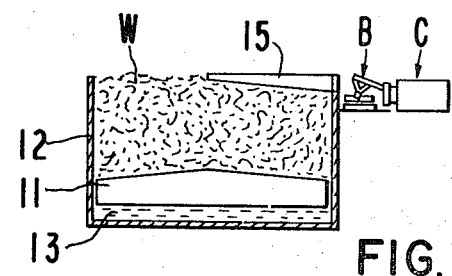

The elevating feature of the material storage and conveying assembly, clearly illustrated by the substantially unloaded and loaded conditions shown in FIGS. 6 and 7 respectively, shredder assembly B since only the uppermost portion of the stored solid wastes are moved radially on the turntable, and the turntable elevation is maintained high enough to assure continuous feed to the shredders without overflow or overloading the shredder conveyors.

While control of the turntable elevation has been described generally above as accomplished by changing the water level within the housing 12, this elevation control can be accomplished by a number of different techniques. The optimum arrangement for any given locality will depend almost completely on local conditions, including cost and quantity of available water supply, excavation difficulties and weather conditions.

Figures 8, 10, 11:
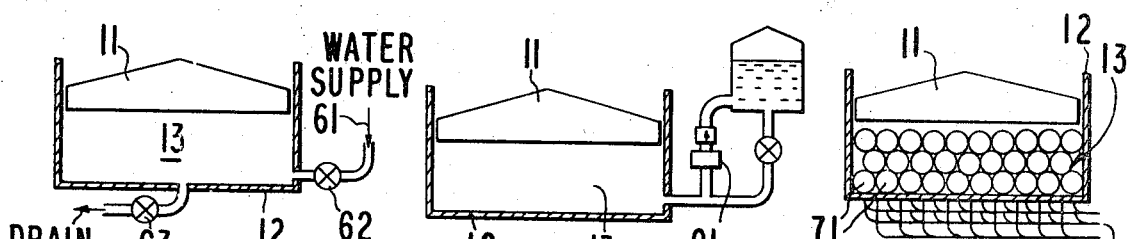

Probably the most straightforward arrangement is the utilization of a continuous water supply 61 is illustrated in FIG. 8. In this embodiment of the invention, a water supply valve 62 is opened to admit water into the carousel housing 12 to raise the turntable 11. Similarly, a drain valve 63 is opened to remove the water and lower the turntable. This method, however, requires a daily supply of nearly half a million gallons of water for a 400 ton per day waste disposal system and this volume of water could be expensive unless water is readily available from a natural source of fresh or salt water or perhaps the effluent from a sewage treatment plant.

A second arrangement is to displace the water with compressed air which is readily available from the gas turbine. A series of inflatable bladders 71 can be used, as shown in FIG. 11. Three tiers of bladders can be used, each tier tethered at a preset elevation; the bladders in each tier are manifolded together and inflated simultaneously with compressed air. Sufficient water would be provided (approximately 5 feet) to float the turntable at its lowest elevation without abrading the deflated bladders. When the turntable is to be raised, air is introduced into the lowest tier of bladders, effectively raising the turntable 5 feet when fully inflated. Similarly, the second and third tiers of bladders would be inflated to raise the turntable 10 and 15 feet respectively. To lower the turntable, the procedure is reversed and air is bled out of each successive tier of bladders. Such a system allows the carousel to operate independent of a large water supply and without the necessity for a large aboveground storage tank. The large number of bladders in each tier makes the system reliable since leakage or failure of any one bladder would not incapacitate the elevating system.

Figure 9:
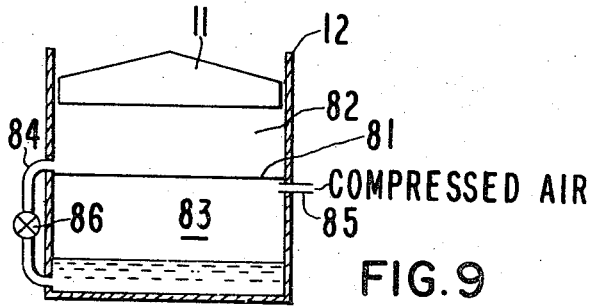

A third approach is shown in FIG. 9 and employs the better features of the two previous schemes without the disadvantages or complexities of either. It does require, however, significant additional excavation to provide underground storage space for 500,000 gallons of water. In this case, the carousel pit 12' is approximately twice as deep as the previous cases to provide underground storage for the water, and is divided in half by a horizontal watertight membrane or plate 81. The two carousel compartments 82 and 83 are connected by pipe 84 as shown to permit the water to be transferred from one compartment to the other. The water moves from the top compartment 82 to the bottom 83 by gravity to lower the turntable, and is forced from the bottom compartment 83 to the top 82 by compressed air 85 from the gas turbine. This transfer can be stopped at any point by closing the valve 86 in the pipe 84 connecting the compartment.

Still another arrangement is shown in FIG. 10 and uses an aboveground water storage 91 tank to accomplish the same effect. Water is pumped or gravity flowed via pipe 92 between the tank 91 and carousel pit 12 to effect the turntable movement. Another variation of this scheme is to use a decorative pond or recreational lake or pool to provide this aboveground water storage function.

We claim:

1. A materials storage and conveying assembly of the type adapted to receive bulk material and store such material for periods of time characterized by a hollow cylindrical chamber, a cylindrical turntable floatable and rotatable in said chamber, means for supporting and elevating said turntable in said chamber, including means for floating said entire turntable in said chamber, and means for turning said turntable in said chamber for receiving and delivering material to and from said turntable.

2. The materials storage and conveying assembly in accordance with claim 1 characterized further in that said floating means includes a supply of water, means for conveying water to and from said chamber, and means for controlling the water level within said chamber to control the elevation of said turntable.

3. The materials storage and conveying assembly in accordance with claim 1 characterized further in that said turntable includes an upper circular surface declining uniformly in height from the center radially outwardly to the periphery thereof.

4. A materials storage and conveying assembly of the type adapted to receive bulk material and store such material for periods of time characterized by a hollow cylindrical chamber, a cylindrical turntable, floatable and rotatable in said chamber, means for supporting and elevating said turntable in said chamber, including means for floating said turntable in said chamber, and means for turning said turntable in said chamber for receiving and delivering material to and from said turntable, said floating means including means defining at least one inner chamber beneath said turntable, means for directing air to and from said inner chamber and means for controlling the volume and pressure of air within said inner chamber for controlling the level of said turntable.

5. A materials storage and conveying assembly of the type adapted to receive bulk material and to store such material for periods of time characterized by a hollow cylindrical chamber, a cylindrical turntable floatable and rotatable in said chamber, means for supporting and elevating said turntable in said chamber including means for floating said entire turntable in said chamber, means for turning said turntable in said chamber for receiving and delivering material to and from said turntable, and a stationary leveling blade positioned above and extending over said turntable for leveling material positioned on said turntable and directing material into an exit chute.

6. A materials storage and conveying assembly of the type adapted to receive bulk material and store such material for periods of time characterized by a hollow cylindrical chamber, a cylindrical turntable floatable and rotatable in said chamber, means for supporting and elevating said turntable in said chamber including means for floating said entire turntable in said chamber, means for turning said turntable in said chamber for receiving and delivering material to and from the top of said turntable, and means positioned above said turntable for conveying material supported on said turntable from said turntable.